US009565592B2

(12) United States Patent
Moulsley et al.

(10) Patent No.: US 9,565,592 B2
(45) Date of Patent: *Feb. 7, 2017

(54) METHOD FOR COMMUNICATING IN A NETWORK, RADIO STATIONS AND A SYSTEM FOR ALLOCATING UPLINK RESOURCE

(71) Applicant: KONINKLIJKE PHILIPS N.V., Eindhoven (NL)

(72) Inventors: Timothy J. Moulsley, Caterham (GB); Paul Bucknell, Brighton (GB)

(73) Assignee: Koninklijke Philips N.V., Eindhoven (NL)

( * ) Notice: Subject to any disclaimer, the term of this patent is extended or adjusted under 35 U.S.C. 154(b) by 172 days.

This patent is subject to a terminal disclaimer.

(21) Appl. No.: 14/096,674

(22) Filed: Dec. 4, 2013

(65) Prior Publication Data

US 2014/0087745 A1    Mar. 27, 2014

Related U.S. Application Data

(63) Continuation of application No. 13/058,260, filed as application No. PCT/IB2009/053472 on Aug. 7, 2009, now Pat. No. 9,119,094.

(30) Foreign Application Priority Data

Aug. 12, 2008 (EP) .................... 08305466

(51) Int. Cl.
*G01R 31/08* (2006.01)
*G06F 11/00* (2006.01)
(Continued)

(52) U.S. Cl.
CPC ............... *H04W 28/04* (2013.01); *H04L 1/08* (2013.01); *H04W 72/042* (2013.01); *H04W 72/0406* (2013.01)

(58) Field of Classification Search
CPC ...... H04W 80/04; H04W 88/06; H04W 88/08; H04W 84/18; H04L 29/06
(Continued)

(56) References Cited

U.S. PATENT DOCUMENTS 8,160,014 B2    4/2012  Ojala et al.
8,170,080 B2    5/2012  Arnott et al.
(Continued)

FOREIGN PATENT DOCUMENTS

EP    2112845 A1    10/2009
WO    2009130543 A1    10/2009

OTHER PUBLICATIONS

Research in Motion et al, "Reliability Analysis of UL SPS Activation Signaling", 3GPP Draft; R2-084314, 3rd Generation Partnership Project, Mobile Competence Centre; 650, Route Des Luciioles; F-06921 Sophia-Antipolis Cedex; France, No. Jeju; Aug. 11, 2008, XP050319384.

(Continued)

*Primary Examiner* — William D Cumming

(57) ABSTRACT

A primary station and at least one secondary station communicate on a downlink control channel in a network, wherein the primary station transmits an indication related to a resource allocated to one of the secondary stations in accordance with a semi persistent schedule, wherein at least two messages, which include at least part of the indication, are transmitted in one subframe.

24 Claims, 2 Drawing Sheets

Figure 1:
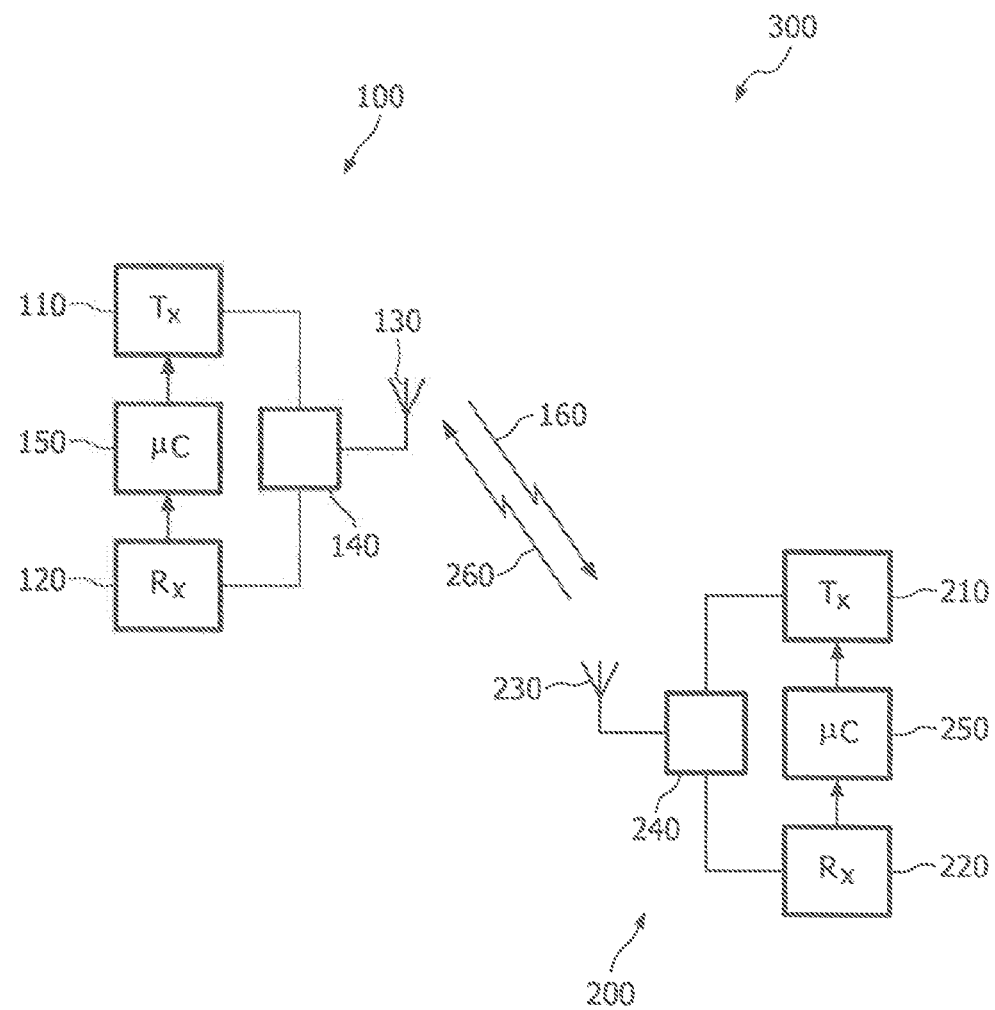

(51) Int. Cl.
*G08C 15/00* (2006.01)
*H04J 1/16* (2006.01)
*H04J 3/14* (2006.01)
*H04L 1/00* (2006.01)
*H04L 12/26* (2006.01)
*H04W 28/04* (2009.01)
*H04L 1/08* (2006.01)
*H04W 72/04* (2009.01)

(58) Field of Classification Search
USPC .................................. 370/328, 329; 714/748
See application file for complete search history.

(56) References Cited

U.S. PATENT DOCUMENTS

| 8,184,672 | B2 | 5/2012 | Arnott et al. | |
| 2009/0249153 | A1* | 10/2009 | Zhang | 714/748 |
| 2010/0115528 | A1 | 5/2010 | Pipponen et al. | |
| 2010/0182939 | A1 | 7/2010 | Ojala et al. | |
| 2012/0069805 | A1 | 3/2012 | Feuersanger et al. | |
| 2012/0113917 | A1 | 5/2012 | Gaal et al. | |
| 2013/0021965 | A1* | 1/2013 | Chu et al. | 370/328 |
| 2014/0105164 | A1* | 4/2014 | Moulsley et al. | 370/329 |

OTHER PUBLICATIONS

Nokia Corp et al, "Indication of Persistent Allocation for UL", 3GPP TSG-RAN WG2 Meeting #6IBIS Shnzhen, China, vol. R2-081962, Mar. 31, 2008, pp. 1-4, XP002498994.

Qualcomm Europe, "Conurrent Dynamic and SPS Grant", 3GPP TSG-RAN WG2 #62, R2-082499, Kansas City, May 5-9, 2008, 1 PAGE.

Qualcomm Europe, "SPS Activationwith Single LPDCCH Activation", 3GPP TSG-RAN WG2 #62, Kansas City, May 5-9, 2008, R2-082498, pp. 1-2.

* cited by examiner

METHOD FOR COMMUNICATING IN A NETWORK, RADIO STATIONS AND A SYSTEM FOR ALLOCATING UPLINK RESOURCE

This application claims the benefit or priority of and describes relationships between the following applications: wherein this application is a continuation of U.S. patent application Ser. No. 13/058,260, filed Feb. 9, 2011, which is the National Stage of International Application No. PCT/IB2009/053472, filed Aug. 7, 2009, which claims the priority of foreign application EP08305466.8 filed Aug. 12, 2008, all of which are incorporated herein in whole by reference.

The present invention relates to a method for communicating in a network comprising a primary station and at least one secondary station, and to such a secondary station. More specifically, this invention relates to a method for communicating in a mobile telecommunication network, like a GSM (Global System for Mobile communications) or a UMTS (Universal Mobile Telecommunications System) network.

This invention is, for example, relevant for UMTS and UMTS Long Term Evolution, but as well to hubs which route connections from multiple terminals to base stations.

In a mobile telecommunication network like a UMTS system, a primary station, for instance a Node B (or Base Station or eNB) communicates with at least one secondary station, for instance a User Equipment (UE or Mobile Station), by means of a plurality of channels. In order to transmit data to the primary station, or to receive data from the primary station, a secondary station needs to listen to signaling message on at least one control channel to know when to transmit or receive, and to know how to transmit or receive. Among the parameters used to determine how to communicate with the primary station, the secondary station needs for instance at least some of the following:

For downlink data transmissions, each such control signalling message may typically include at least some or all of the following:
  Time-frequency resource allocation,
  Number of MIMO (Multiple In Multiple Out) layers used,
  Hybrid ARQ (Automatic ReQuest) process number,
  Modulation and Coding Scheme for each layer,
  New data indicator for each layer,
  Redundancy version for each layer,
  Precoding information for each layer,
  UE identity,
  Cyclic Redundancy Cycle.

Usually, all these parameters are transmitted on a single control channel. However, for some applications, a semi persistent scheduling with a particular signaling is used. In accordance with semi persistent scheduling scheme, a resource is allocated for instance periodically (i.e. each subframe or each $n^{th}$ subframe) for a large period of time. This is used for instance for communication where repeated resources will be used, like Voice over IP. By using this semi persistent allocation, it is possible to fix some parameters of the future transmissions, for instance by higher layer signaling, and the required amount of signaling to be transmitted on the control channel is reduced. The transmission on higher layer has the drawback of being not as quick as the normal signaling. However, this is well adapted for semi persistent scheduling.

What still needs to be transmitted to the secondary station on the control channel is a message to activate or deactivate or modify a Semi Persistent Scheduling (SPS).

However, if this SPS message is missed or wrongly decoded, or received in error, this can lead to several problems, like collisions with another communication or corruption, leading to delays and errors.

It is an object of the invention to propose a method for alleviating these problems.

Another object of the invention is to propose a method improving the reliability of transmission of the SP S messages.

Still another object of the invention is to propose a method improving the robustness of SPS messages without causing more delay in the signalling.

Still another object of the present invention is to improve the reliability of the SPS messages without increasing the amount of overhead or without changing the current transceiver implementation.

To this end, in accordance with a first aspect of the invention, it is proposed a method for communicating in a network comprising the step a) of a primary station transmitting to at least one secondary station on a downlink control channel an indication related to a resource allocated to said secondary station in accordance with a semi persistent schedule, wherein the step a) comprises the step of transmitting to the secondary station at least two messages including at least part of the indication in one subframe.

In accordance with a second aspect of the invention, a primary station is proposed, said primary station comprising means for communicating with at least one secondary station, wherein the primary station comprises a transmitter for transmitting the secondary station on a control channel an indication related to a resource allocated to said secondary station in accordance with a semi persistent schedule, wherein the transmitter is arranged to transmit to the secondary station at least two messages including at least part of the indication in one subframe.

In accordance with a third aspect of the invention, a secondary station is proposed, said secondary station comprising means for communicating with at least one primary station, the secondary station comprising a receiver for receiving from the primary station on a control channel an indication related to a resource allocated to said secondary station in accordance with a semi persistent schedule, wherein the secondary station is arranged for receiving within one subframe at least two messages including each at least part of the indication.

In accordance with a fourth aspect of the invention, a communication system is proposed, said communication system comprising a primary station communicating with at least one secondary station, wherein the primary station comprises a transmitter for transmitting to the at least one secondary station on a control channel an indication related to a resource allocated to said secondary station in accordance with a semi persistent schedule, wherein the transmitter is arranged to transmit within one subframe to the secondary station at least two messages including at least part of the indication.

As a consequence, the likelihood of the message relating to a semi persistent schedule being received correctly is increased, and the likelihood of the message being received incorrectly is decreased. Moreover, since the secondary station tries to blind decoding all possible messages on the control channel to check whether one is addressed to itself, it is not required to change the implementation of the secondary stations or the size of the messages. Moreover, this permits to have a quick and reliable signalling compared to higher layer signalling which causes overhead and sometimes delays. It is to be noted that the fact that two messages are in the same subframe permits to reduce delays, when compared with a solution where a plurality of messages are sent over a plurality of subframes.

It is to be noted that this solution comes into opposition with the current assumption for Long Term Evolution in 3GPP, according to which a secondary station would only receive one signalling message on the PDCCH per subframe.

These and other aspects of the invention will be apparent from and will be elucidated with reference to the embodiments described hereinafter.

The present invention will now be described in more detail, by way of example, with reference to the accompanying drawing, wherein:

FIG. 1 is a block diagram of a system in which is implemented the invention.

Figure 2:
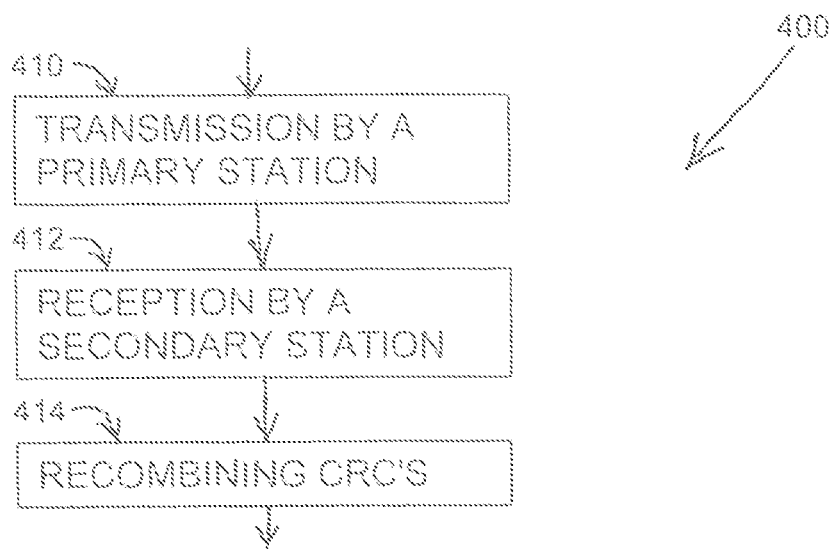

FIG. 2 illustrates an example embodiment 400 of the method of the invention for communicating in a network of at least one primary station and at least one secondary station. Numbers below 400 refer to FIG. 1 and numbers 400 or higher refer to FIG. 2. The embodiment comprises the step 410 in which a primary station 100 transmits to at least one secondary station 200 on a control channel an indication related to a resource allocated to said secondary station 200 in accordance with a semi persistent schedule. wherein the transmitter is arranged to transmit to the secondary station at least two messages including at least part of the indication in one subframe, wherein the two messages may be identical or different.

At step 412 the transmitted indication is received by the at least one secondary station 200 wherein the secondary station is arranged for receiving within one subframe at least two messages including each at least part of the indication.

A first message of the at least two messages and a second message of the at least two messages may comprise a first part and a second part of a cyclic redundancy check, respectively, and the exemplary embodiment 400 shown in FIG. 2 may further comprise the secondary station 200 recombining the first and second parts into the cyclic redundancy check upon reception of the first and second messages as shown in step 414.

The present invention relates to a system of communication 300 as depicted on FIG. 1, comprising a primary station 100, like a base station, and at least one secondary station 200 like a mobile station.

The radio system 300 may comprise a plurality of the primary stations 100 and/or a plurality of secondary stations 200. The primary station 100 comprises a transmitter means 110 and a receiving means 120. An output of the transmitter means 110 and an input of the receiving means 120 are coupled to an antenna 130 by a coupling means 140, which may be for example a circulator or a changeover switch. Coupled to the transmitter means 110 and receiving means 120 is a control means 150, which may be for example a processor. The secondary station 200 comprises a transmitter means 210 and a receiving means 220. An output of the transmitter means 210 and an input of the receiving means 220 are coupled to an antenna 230 by a coupling means 240, which may be for example a circulator or a changeover switch. Coupled to the transmitter means 210 and receiving means 220 is a control means 250, which may be for example a processor. Transmission from the primary radio station 100 to the secondary station 200 takes place on a downlink channel 160 and transmission from the secondary radio station 200 to the first radio station 100 takes place on an uplink channel 260.

In current versions of the specifications for the UMTS LTE, signalling is provided on a control channel (called PDCCH) transmitted from the primary station (eNB) to the secondary station (UE) to indicate the transmission resources used for data transmission between both of them.

For example, for downlink data transmissions, each such control signalling message may typically include at least some or all of the following: Time-frequency resource allocation, Number of MIMO layers used, Hybrid ARQ process number, MCS for each layer, new data indicator for each layer, redundancy version for each layer, Precoding information for each layer, UE identity, CRC.

In UMTS and also in LTE, usually one control signalling message is transmitted per secondary station per subframe. As a consequence, each secondary station tries to decode all the messages on the control channel to find a message which is addressed to this secondary station.

One feature under discussion for UMTS LTE is semi-persistent scheduling (SPS). This may be applied in uplink or downlink or both. What is meant by semi persistent scheduling, is that, for instance, in the uplink, resources are granted for the secondary station transmission on a periodic basis (i.e. a given resource allocation is available every n subframes). A secondary station is configured to use SPS by higher layer signalling which may specify the period for instance or other parameters. Currently it is proposed to activate or deactivate the schedule using a message on the control channel PDCCH. An existing message format would be used. The same scheduling messages are also proposed for controlling a semi-persistent schedule (SPS). This control may be to activate, deactivate or modify a SPS. A SPS (for which some parameters may be configured by higher layers), grants resources on a periodic basis in order to match the needs of specific applications. (e.g. uplink transmission resources every 20 ms to support VoIP).

However, there is a problem if an activation is falsely detected, since uplink transmissions would start erroneously causing interference. Currently, the SPS activation message have a different identifier (called SPS-RNTI for SPS Radio Network Temporary Identifier) encoded in the Cyclic redundancy check, and can therefore be distinguished from normal messages (with an identifier called C-RNTI for Cell Radio Network Temporary Identifier).

If a message relating to SPS is received in error, or one is received when none was transmitted, then the following problems can occur until the SPS is terminated:

For uplink SPS:

Transmission using an uplink resource when none was expected by the eNodeB, potentially corrupting other uplink transmissions, and probably followed by one or more re-transmissions.

For downlink SPS:—

The UE attempts to decode a PDSCH packet not intended for it, followed by uplink transmission of an NACK (which the eNodeB is likely to either ignore or misinterpret as being from a different UE).

Therefore methods to improve the reliability of this signalling are of interest, in particular to reduce the number of falsely detected PDCCHs (i.e. the secondary station receives a signal which it decodes and the CRC passes, even though no PDCCH was transmitted for that secondary station).

Already proposed solutions to improve reliability of SPS grant messages are:

Increase the CRC length. This may require modification of current transceiver implementation.

Fix some bits in the PDCCH message to effectively increase the length of the CRC. This has the disadvantage that the message contents are restricted.

Use RRC (higher layer) signalling. This implies more overhead.

In accordance with the first aspect of the invention, the solution proposed is to use two PDCCH messages at the same time, i.e. in the same subframe. In one example of the invention, the messages should be identical. The only disadvantage is the increased overhead compared with a single PDCCH. It can also removes the need to encode SPS grants with a different ID (SPS-RNTI). This could be considered as a double length PDCCH with two copies of the data and CRC. In another example of the invention, the messages may be different. For the case when two messages are useful this avoids the increased overhead.

In fact, this invention is based on the recognition that a solution based on the UE receiving two PDCCH's in the same subframe can achieve the desired result but without any extra delay. Currently the assumption for LTE in 3GPP is that the UE would only receive one PDCCH per subframe (or at least only one PDDCH for UL and one for DL). However, since the secondary station would typically try blind decoding all possible PDCCHs within a given search space, there is no practical difficulty in receiving more than one.

In one embodiment based on LTE, a SPS message is indicated by reception of two identical PDCCH messages with the same SPS-RNTI encoded in the CRC. In this embodiment, if only one PDCCH message were received, the UE could interpret this as a potential SPS message but only transmit (or receive) one packet.

In another embodiment based on LTE, a SPS message is indicated by reception of two identical PDCCH messages except that they have different RNTIs encoded in the CRC. One could be the C-RNTI for normal signalling and the other the SPS-RNTI. In this embodiment, if only one PDCCH message were received with SPS-RNTI, the UE could interpret this as a potential SPS message. In such a case, in order to limit interference, the UE could be required to only transmit (or receive) one packet if only the C-RNTI is received, and no packets if only the SPS-RNTI is received. One advantage of this embodiment is that the starting position in the control channel space of the PDCCH carrying the SPS message could be unambiguously identified (e.g. as corresponding to the PDCCH with the normal C-RNTI). This would be important if uplink resources (e.g. for ACK/NACK) are determined by the PDCCH starting position.

In another embodiment based on LTE, the UE recognises an SPS message sent via PDCCH only if it also receives another PDCCH message sent at the same time. For example, an SPS message granting uplink resources (indicated by SPS-RNTI) would be sent at the same time as an ordinary message granting DL resources (indicated by C-RNTI). Since the UE has received two PDCCH messages, it can recognise the SPS message. As another example, an SPS message granting uplink resources would be sent at the same time as another SPS message granting downlink resources. Since the UE has received two PDCCH messages, it can recognise both as SPS messages. In case the eNodeB does not have two PDCCH messages to send, then two identical copies of one message could be sent, or the second message could have a null or zero resource allocation.

It is to be noted that in variants of the invention, the allocated resource specified by the SPS is a downlink resource, i.e. the secondary station receives periodically data in this semi persistently scheduled resource.

In other variants of the invention, the allocated resource specified by the SPS is an uplink resource, i.e. the secondary station transmits periodically data in this semi persistently scheduled resource.

This invention may be implemented in mobile communication systems where communication devices utilize centralized scheduling, such as UMTS and LTE, WiMAX, or UWB.

Moreover, this invention could as well be implemented for hubs which route connections from multiple terminals to base stations. Such devices would appear like a secondary station from the point of view of the network.

In the present specification and claims the word "a" or "an" preceding an element does not exclude the presence of a plurality of such elements. Further, the word "comprising" does not exclude the presence of other elements or steps than those listed.

The inclusion of reference signs in parentheses in the claims is intended to aid understanding and is not intended to be limiting.

From reading the present disclosure, other modifications will be apparent to persons skilled in the art. Such modifications may involve other features which are already known in the art of radio communication and the art of transmitter power control and which may be used instead of or in addition to features already described herein.

The invention claimed is:

1. A method for communicating in a network comprising:
transmitting, from a primary station to a secondary station on a control channel, an indication related to a resource allocated to said secondary station in accordance with a semi persistent schedule,
wherein the transmitting comprises transmitting at least two messages to the secondary station, each message including at least part of the indication in one subframe wherein a first message to the secondary station relates to an allocated resource which is an uplink resource allocated for the secondary station and a second message to the secondary station relates to an allocated resource which is a downlink resource allocated for the primary station for transmitting to the secondary station.

2. The method of claim 1, wherein each message comprises a message identifier identifying each message, and wherein the message identifiers of the two messages are equal.

3. The method of claim 2, wherein the message identifiers are encoded in a cyclic redundancy check, and wherein the two messages comprise the same cyclic redundancy check.

4. The method of claim 1, wherein each message comprises a message identifier identifying each message, and wherein the first message comprises a first identifier, and wherein the second message comprises a second identifier, being different from the first identifier.

5. The method of claim 4, wherein the first identifier identifies a signaling message, and wherein the second identifier is assigned to the secondary station.

6. The method of claim 5, wherein if the secondary station receives only the first message, the secondary station prevents itself from transmitting a data packet.

7. The method of claim 5, wherein if the secondary station receives only the first message, the secondary station uses a reception of the second message as a time reference.

8. The method of claim 1, wherein the two messages are transmitted simultaneously.

9. The method of claim 1, wherein the first message and the second message comprise respectively a first part and a second part of a cyclic redundancy check, and further comprising the secondary station recombining the first and second parts into the cyclic redundancy check upon reception of the first message and the second message.

10. A primary station for communicating with a secondary station, wherein the primary station comprises:
an antenna; and
a transceiver coupled to the antenna and configured to transmit to the secondary station on a control channel an indication related to a resource allocated to said secondary station in accordance with a semi persistent schedule, wherein the transceiver is arranged to transmit at least two messages to the secondary station, each message including at least part of the indication in one subframe wherein a first message to the secondary station relates to an allocated resource which is an uplink resource allocated for the secondary station and a second message to the secondary station relates to an allocated resource which is a downlink resource allocated for the primary station for transmitting to the secondary station.

11. A secondary station for communicating with at least one primary station, the secondary station comprising:
an antenna; and
a transceiver coupled to the antenna and configured to receive from the primary station on a control channel an indication related to a resource allocated to said secondary station in accordance with a semi persistent schedule, wherein the secondary station is arranged for receiving within one subframe at least two messages, each message including each at least part of the indication wherein a first message to the secondary station relates to an allocated resource which is an uplink resource allocated for the secondary station and a second message to the secondary station relates to an allocated resource which is a downlink resource allocated for the primary station for transmitting to the secondary station.

12. A communication system comprising:
at least one secondary station configured to receive a transmission from a primary station; and
the primary station configured to communicate with the at least one secondary station, wherein the primary station comprises a transmitter configured to transmit to the at least one secondary station on a control channel an indication related to a resource allocated to the at least one secondary station in accordance with a semi persistent schedule, wherein the transmitter is arranged to transmit within one subframe at least two messages to the at least one secondary station, each message including at least part of the indication, and wherein a first message to the at least one secondary station relates to an allocated resource which is an uplink resource allocated for the at least one secondary station and a second message to the at least one secondary station relates to an allocated resource which is a downlink resource allocated for the primary station for transmitting to the at least one secondary station.

13. The primary station of claim 10, wherein each message comprises a message identifier identifying each message, and wherein the message identifiers of the two messages are equal.

14. The primary station of claim 10, wherein the message identifiers are encoded in a cyclic redundancy check, and wherein the messages comprise the same cyclic redundancy check.

15. The primary station of claim 10, wherein each message comprises a message identifier identifying each message, and wherein a first message comprises a first identifier, and wherein a second message comprises a second identifier, being different from the first identifier.

16. The primary station of claim 15, wherein the first identifier identifies a signaling message, and wherein the second identifier is configured to be assigned to a secondary station.

17. The primary station of claim 10, wherein the messages are transmitted simultaneously.

18. The primary station of claim 10, wherein a first message and a second message of the at least two messages comprise, respectively, a first part and a second part of a cyclic redundancy check that are configured to be recombined by the secondary station.

19. The secondary station of claim 11, wherein each message comprises a message identifier identifying each message, and wherein the message identifiers of the two messages are equal.

20. The secondary station of claim 11, wherein the message identifiers are encoded in a cyclic redundancy check, and wherein the messages comprise the same cyclic redundancy check.

21. The secondary station of claim 11, wherein each message comprises a message identifier identifying each message, and wherein a first message comprises a first identifier, and wherein a second message comprises a second identifier, being different from the first identifier.

22. The secondary station of claim 21, wherein the first identifier identifies a signaling message, and wherein the second identifier is configured to be assigned to the secondary station.

23. The secondary station of claim 11, wherein the messages are transmitted simultaneously.

24. The secondary station of claim 11, wherein a first message and a second message of the at least two messages comprise, respectively, a first part and a second part of a cyclic redundancy check that are configured to be recombined by the secondary station.

* * * * *